April 8, 1958     A. G. AVILA     2,829,752
ARTICLE DISTRIBUTING MECHANISM

Filed April 8, 1954     3 Sheets-Sheet 1

INVENTOR.
ABELARDO G. AVILA
BY
*Otto Maeller*
ATTORNEY

April 8, 1958  A. G. AVILA  2,829,752
ARTICLE DISTRIBUTING MECHANISM
Filed April 8, 1954  3 Sheets-Sheet 2

INVENTOR.
ABELARDO G. AVILA
BY
Otto Moeller
ATTORNEY

April 8, 1958  A. G. AVILA  2,829,752
ARTICLE DISTRIBUTING MECHANISM
Filed April 8, 1954  3 Sheets-Sheet 3

INVENTOR.
ABELARDO G. AVILA
BY
Otto Maeller
ATTORNEY

United States Patent Office 2,829,752
Patented Apr. 8, 1958

2,829,752

ARTICLE DISTRIBUTING MECHANISM

Abelardo G. Avila, York, Pa., assignor, by mesne assignments, to Capital Products Corporation, Mechanicsburg, Pa., a corporation of Pennsylvania Application April 8, 1954, Serial No. 421,940

5 Claims. (Cl. 193—39)

This invention relates to an improvement in distributors and more particularly for handling and conducting pieces or balls of dough and depositing the dough pieces or balls on a suitable support or pan in rows, although it will be evident that other material than dough may be employed.

This invention is an improvement of the invention set forth in Patent No. 2,670,888 of March 2, 1954, wherein certain elements or features of the distributor have been changed and improved in depositing the dough pieces or balls on a dough panning machine.

An object of the invention is in the provision of flip-flop mechanism which insures the flip-flop when flipped from one position to another position by a dough ball any rebound thereof will be eliminated and arrested.

A further object of the invention is in the provision of means such as rolls to impress a uniform and effective driving force on the dough balls for actuating the flip-flop in a positive manner and with a snap-like action.

While the invention is applicable to the depositing of material other than dough, the distributor is shown applied to a dough panning machine, and for convenience the material operated on will be referred to as dough pieces or balls.

Figure 1:
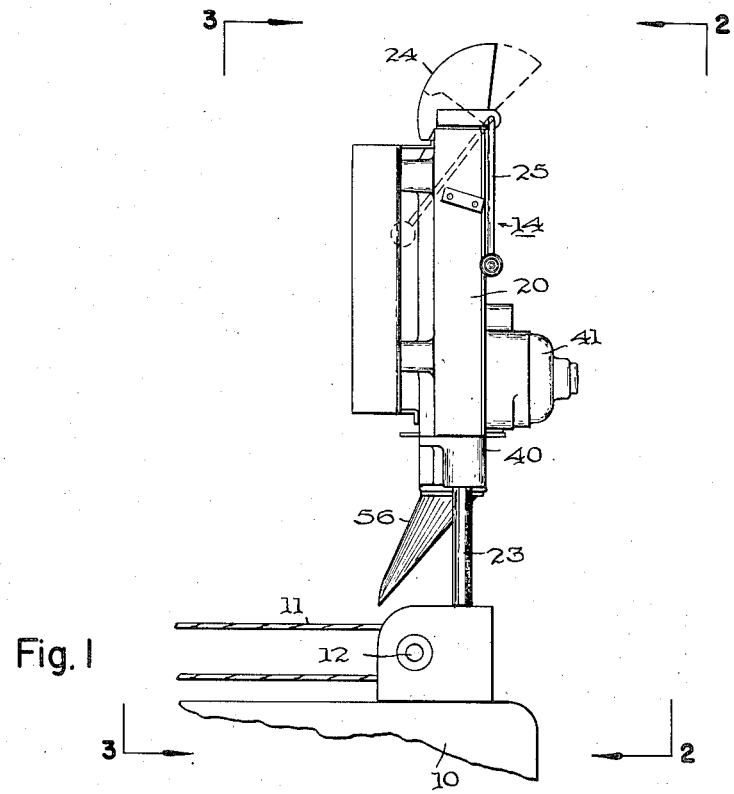
Figure 1 is a view in end elevation of the invention.
Figure 2:
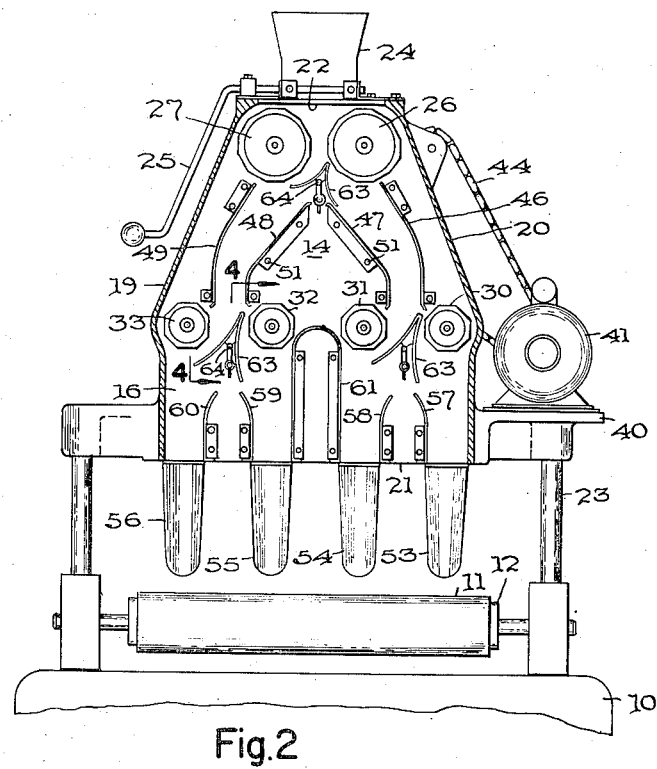
Figure 2 is a view in side elevation taken on lines 2—2 of Figure 1.
Figures 7, 8:
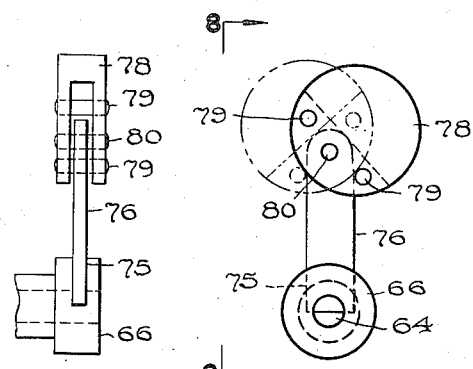
Figure 7 is a view in elevation of the rebound arrestor taken on lines 7—7 of Figure 5.
Figure 8 is a view in end elevation of the arrestor taken on lines 8—8 of Figure 7.
Figure 3:
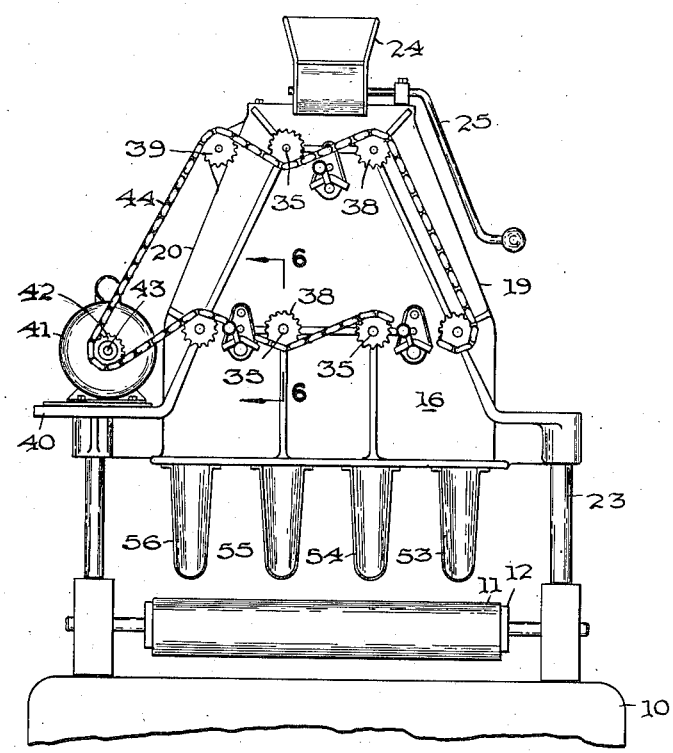
Figure 3 is a view in side elevation taken on lines 3—3 of Figure 1.
Figure 5:
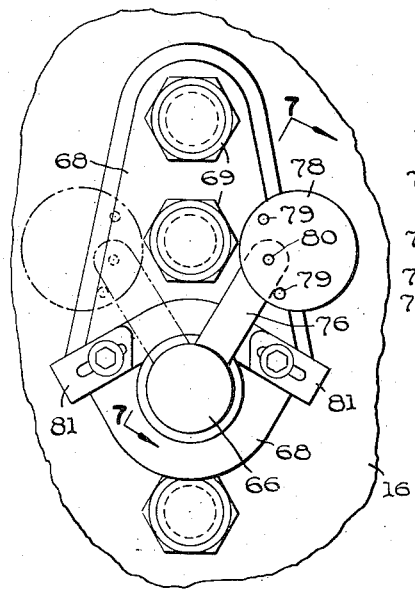
Figure 5 is a view in end elevation of the flip-flop taken on lines 5—5 of Figure 4.

In Figures 1 to 3, the distributor is shown mounted on the frame 10 of a dough panner, having a conveyor belt 11 traveling over a roll 12 mounted on the frame 10.

The distributor 14 comprises a pair of parallel transversely extending upright walls 16 and 17 and a pair of upward converging end walls 19 and 20, forming a housing generally triangular in traverse cross section, which housing is open at its top and bottom. As illustrated the front wall 16 and end walls 19 and 20, are preferably formed as a unit, such as a casting, with the wall 17 detachable therefrom for access to the interior of the distributor housing. Standards or posts 23 support the housing 14 above the frame 10 and conveyor 11.

Mounted on the housing 22 over the top opening 22 is a hopper 24 through which the dough pieces or balls are discharged into the distributor housing. A handle 25 is connected to the hopper for oscillating it to divert the dough balls from the distributor when desired.

Figure 6:
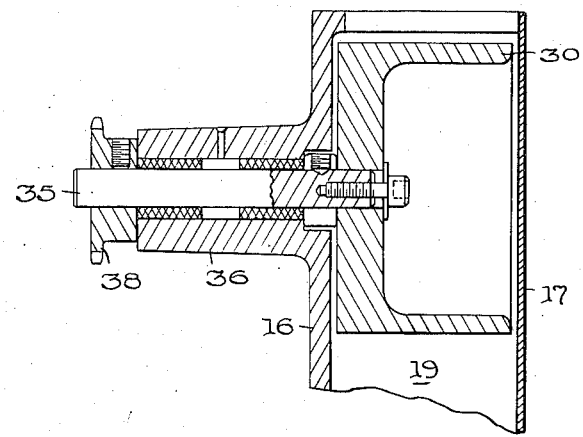
Figure 6 is a detail sectional view of a feed roll taken on lines 6—6 of Figure 3.

Located in the distributor and beneath the hopper 24 and top opening 22 are two feed rolls 26, 27 mounted on the front wall 16. Arranged in the distributor housing 14 transversely thereof and in the space between the feed rolls 26 and 27, and the bottom opening 21 are two pairs of feed rolls 30 and 31, and 32 and 33, which are preferably of smaller diameter than the rolls 26 and 27. In Figure 6 is illustrated the manner of mounting the feed rolls 26 and 27, 30 and 31, and 32 and 33 within the distributor housing and reference to the mounting of one of the rolls would be considered adequate for the several rolls. As shown in Figure 6, the roll 30 is connected to a shaft 35 which extends through the front wall 16 and is journaled in a trunnion 36 formed on the outer surface of the front wall. Each shaft is provided on its outer end with a sprocket wheel 38, which is secured thereto for rotation with the shaft, see Figure 3.

Mounted on the base flange 40 of the housing and exteriorly thereof is an electric motor 41, which may be operated from any suitable source of power. Entrained over a sprocket wheel 42 on the motor shaft 43 is a chain 44 which passes over the sprocket 38 of roll 30 and beneath sprocket 38 of roll 31, and thence over sprocket 38 of roll 32 and thence beneath sprocket 38 of roll 33, and thence over sprocket 38 of roll 27, and thence under the sprocket 38 of roll 26 and then over the idler sprocket 39 journaled on the outer surface of end wall 20 and thence to the motor. Referring to Figures 2 and 3, the various feed rolls are rotated by the motor 41 and chain 44 so that the roll 26 will rotate counter-clockwise, while roll 27 will rotate clockwise; and one pair of rolls 30 and 31 will rotate so that roll 31 rotates clockwise, while roll 30 rotates counterclockwise, and likewise roll 33 will rotate clockwise and roll 32 counterclockwise, so that the dough balls as they are fed from the hopper into the distributor housing will be properly conducted through their respective paths or passages and discharged through the open bottom 21 of the housing.

Mounted on the inner surface of the wall 16 are two pairs of guide plates 46 and 47, and 48 and 49, which are secured to the wall 16 by any suitable means 51. The pair of guide plates 46, 47 are so shaped and spaced from one another as to form a passage leading from beneath the rolls 26 and 27 for directing a dough ball between the feed rolls 30 and 31, and the guide plates 48 and 49 are similarly arranged beneath the feed rolls 26 and 27 for directing and forming a passage for a dough ball to be delivered between the feed rolls 32 and 33. Arranged at the bottom of the housing are four discharge spouts 53, 54, 55 and 56. A pair of guide plates 57 and 58 are secured to the wall 16 beneath the rolls 30 and 31 for directing the dough ball either to the spout 53 or spout 54, and similar guide plates 59 and 60 are secured to the wall 16 beneath the rolls 32 and 33 for directing the dough balls either to the spout 55 or spout 56. A fixed guide 61 is disposed on the front wall 16 and between the spouts 54 and 55 and guide plates 58 and 59 so that the dough balls will be properly directed to these spouts.

Figure 4:
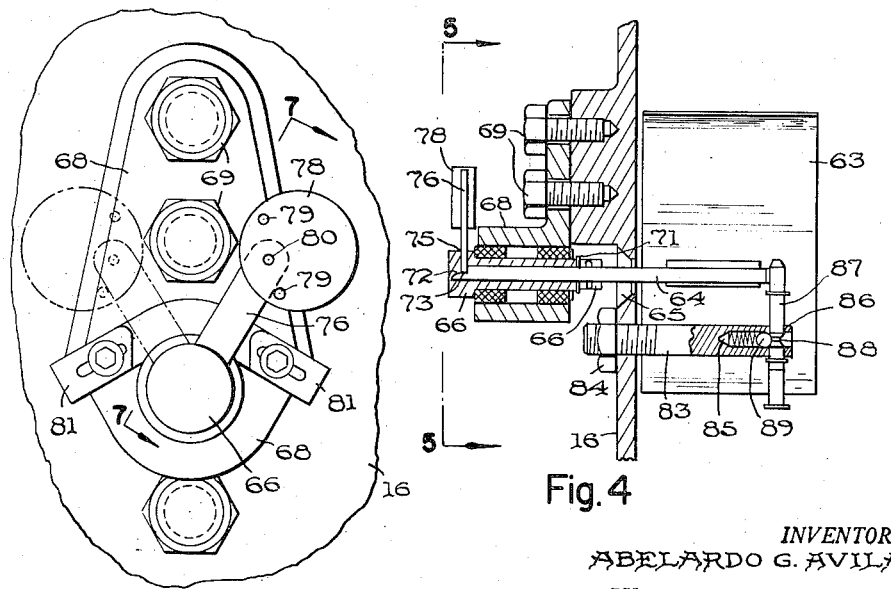
Figure 4 is a detail sectional view of the flip-flop taken on lines 4—4 of Figure 2.

Mounted on the inner surface of the front wall beneath the feed rolls 26 and 27 and the rolls 30 and 31 and rolls 32 and 33, are deflectors or flip-flops 63. These flip-flops are preferably shaped in the form of an inverted V and from their apex flare outwardly. The flip-flops, see Figure 4, are mounted on shafts 64 which extend through openings 65 in the wall 16. The shaft 64 is fitted within a sleeve 66 at its outer end, and which sleeve is journaled in a bearing bracket 68 secured to the outer surface of wall 16 by screw bolts 69. The sleeve 66 is slotted at its inner end for the reception of a retaining key 71 which extends through the shaft 64 so that the sleeve 66 and shaft 64 will rotate together. The outer end of the sleeve 66 is preferably closed and the bore thereof is reduced to provide a recess 72 for the reception of the notched end 73 of shaft 64. A slot 75 is provided through the wall of the sleeve which intersects the notched end of the shaft 64. A lever arm 76 conforming to the slot 75 is received therein and is engaged by the shaft 64 and notched end thereof for rigidly retaining the arm in place. A free swinging weight 78 is eccentrically pivoted to the outer end of the lever arm 76 and is provided with a stop pin 79 on each side of the pivot 80, to limit the oscillatory movement of the weight on the lever arm by the pins 79 engaging the lever arm. Mounted on the outer end of the bearing bracket 68 are two stop arms 81, which limit the oscillatory movement of the lever arm 76 and flip-flop 63.

A post 83 extends through the wall 16 and is secured thereto by a nut 84 having screw threaded engagement with the post. The post extends into the housing 14 in parallel relation to the shaft 64 of the flip-flop 63, and the post is provided with an axial recess 85 at its inner end and a hole 86 extending transversely therethrough which intersects the recess 85. A retainer pin 87 extends through the hole 86 and across the end of the shaft 64 to hold the shaft against axial movement. The pin 87 is provided with an annular groove 88 which receives a ball 89 located in the recess 85 of the post 83 for holding the pin against movement. A spring 90 urges the ball 89 into the groove 88 of the pin 87.

This manner of supporting the flip-flops 63 permits their easy and simple removal for cleaning and so forth by withdrawing the retaining pin 87 from engagement with the end of the shaft 64 and then by withdrawing the retaining key 71 from the shaft 64 and disengaging it from the sleeve 66 the shaft 64 and the flip-flops 63 can be withdrawn. There is sufficient clearance between the upper end of the retaining pin 87 and the end of the shaft 64 so that there is no interference with the rotation of the shaft 64.

With the present invention the possibilty of rebound of the flip-flops is eliminated. The operation of the flip-flops is caused by the impact of each ball of dough striking one of the walls of the flip-flop and the dough then passing into a passage between either the guide plates 48 and 49 or 47 and 46, and as the dough strikes the wall of the flip-flop it immediately causes it to be oscillated from the position it assumed before the impact by the dough ball to its opposite position. To prevent the flip-flop returning to the original position it had first assumed upon being struck by the dough ball the arresting mechanism, such as the arm 76 and swinging weight 78 will prevent the flip-flop rebounding to its original or first position by being held in the position to which it has oscillated and held in such position until the opposite wall of the flip-flop is struck by another dough ball passing either between the rolls 26 and 27 or the rolls 32, 33 or 30, 31. This is accomplished by the free swinging weight 78 which is eccentrically pivoted to the arm 76 which is provided with stop pins 79 to hold the arm 76 in the position to which it has been swung upon the actuation of the flip-flop. That is, if the weight 78 is thrown off center due to centrifugal action and will carry the lever arm 76 against one or the other of the stop arms 81. Ordinarily without these free swinging weights the impact of the lever arm 76 against the stops 81 would tend to cause the flip-flop to rebound, but at the moment of contact by the lever arm 76 with either stop 81 this sudden stop of the arm catapults the free swinging weight thus producing a force in the opposite direction as that tending to cause rebound and thereby neutralizing such rebound action. The flip-flops 63 are so disposed with respect to the respective feed rolls 26, 27, and 30, 31 and 32, 33, that the apex of the flip-flops are disposed in a position to cooperate with the feed rolls, that is, as the dough is delivered from the hopper 24 between the feed rolls 26 and 27 these rolls will impress a uniform and effective driving force on the dough balls against a wall of a flip-flop for actuating the same in a positive manner.

A dough ball upon passing the rolls 26 and 27 will actuate the flip-flop causing the dough ball to be directed either into the passage between the guide plates 46 and 47, or 48 and 49, and thence against either the roll 30 or 31 and its flip-flop 63 or the flip-flop associated with the rolls 32 and 33, so that upon passing of the dough ball beyond the rolls 30 and 31, or 32 and 33 it will be directed by the flip-flop into one of the spouts 53, 54, 55 or 56, depending of course upon the position of the flip-flop.

I claim:

1. In a distributor for dough pieces, comprising a wall having a deflector pivoted thereto for deflecting the dough pieces alternately to opposite sides of said deflector, said pivotal mounting including a shaft connected to said deflector and rotatably mounted on said wall, an arm extending outwardly from said shaft and connected thereto for rotation therewith, stops carried by said wall for engaging said arm to limit the oscillation of said deflector in either direction of its movement and a weight eccentrically pivoted to said arm, said weight being catapulted on said arm upon said arm engaging one of said stops to prevent rebound of said deflector.

2. In a distributor for dough pieces, comprising a wall having a deflector pendulously mounted along one side thereof for deflecting the dough pieces alternately to opposite sides of said deflector, said pendulous mounting including a shaft connected to said deflector and extending through said wall, a bracket mounted on the opposite surface of said wall from said deflector, a sleeve journaled in said bracket and supporting an end of said shaft, means for rotatably connecting the shaft and sleeve together, a lever arm connected to said sleeve, stops on said bracket for engaging said arm to limit the oscillation of said deflector in either direction of its movement and a weight eccentrically pivoted to said arm, said weight being catapulted on said arm upon said arm engaging one of said stops to prevent rebound of said deflector.

3. In a distributor for dough pieces, comprising a wall having a deflector pendulously mounted along one side thereof for deflecting the dough pieces alternately to opposite sides of said deflector, said pendulous mounting including a shaft connected to said deflector and extending through said wall, a bracket mounted on the opposite surface of said wall from said deflector, a sleeve journaled in said bracket and supporting an end of said shaft, means for rotatably connecting the shaft and sleeve together, a lever arm connected to said sleeve, stops on said bracket for engaging said arm to limit the oscillation of said deflector in either direction of its movement and a weight eccentrically pivoted to said arm, said weight being catapulted on said arm upon said arm engaging one of said stops to prevent rebound of said deflector, a post connected to said wall and extending in parallelism to said shaft and a retaining pin movably mounted on said post and extending across the end of said shaft to prevent axial movement of said shaft, and means for releasably connecting said pin to said post.

4. A distributor for dough pieces, comprising an upright wall and an inverted V-shaped deflector pivotally mounted thereon for deflecting the dough pieces alternately to opposite sides of said deflector, said pivotal mounting including a horizontal shaft disposed centrally between and attached to the sides of said V-shaped deflector, said shaft being disposed below the center of gravity of said deflector and being rotatably mounted on said wall, an arm mounted for movement with said shaft and extending upwardly therefrom in the same direction as the apex of said inverted V-shaped deflector, stops carried by said wall for engaging said arm to limit the oscillation of said deflector in either direction of its movement, and a weight eccentrically pivoted to said arm, said weight being catapulted on said arm upon said arm engaging one of said stops to prevent rebound of said deflector.

5. An apparatus as defined in claim 4 wherein said weight carries stops engaging said arms for retaining said weight in an unbalanced position at the extreme positions of oscillation of said deflector.

References Cited in the file of this patent

UNITED STATES PATENTS

| | | |
|---|---|---|
| 1,062,379 | Anderson et al. | May 20, 1913 |
| 2,066,869 | Wild | Jan. 5, 1937 |
| 2,549,773 | Carroll | Apr. 24, 1951 |
| 2,670,888 | Avila | Mar. 2, 1954 |

FOREIGN PATENTS

| | | |
|---|---|---|
| 83,869 | Germany | Nov. 4, 1895 |